(12) United States Patent
Hakii (10) Patent No.: US 7,760,413 B2
(45) Date of Patent: Jul. 20, 2010

(54) DISPLAY ELEMENT

(75) Inventor: Takeshi Hakii, Sagamihara (JP)

(73) Assignee: Konica Minolta Holdings, Inc. (JP)

( * ) Notice: Subject to any disclaimer, the term of this patent is extended or adjusted under 35 U.S.C. 154(b) by 37 days.

(21) Appl. No.: 12/302,579

(22) PCT Filed: May 22, 2007

(86) PCT No.: PCT/JP2007/060427

§ 371 (c)(1),
(2), (4) Date: Nov. 26, 2008

(87) PCT Pub. No.: WO2007/142025

PCT Pub. Date: Dec. 13, 2007

(65) Prior Publication Data

US 2009/0237769 A1   Sep. 24, 2009

(30) Foreign Application Priority Data

Jun. 2, 2006 (JP) .............................. 2006-154403

(51) Int. Cl.
*G02F 1/153* (2006.01)
*G02F 1/15* (2006.01)
(52) U.S. Cl. ...................... 359/270; 359/265
(58) Field of Classification Search ................ 359/265, 359/270, 272, 273
See application file for complete search history.

(56) References Cited

U.S. PATENT DOCUMENTS 5,764,401 A     6/1998  Udaka et al.
7,480,088 B2 *  1/2009  Kawahara et al. ........... 359/268

FOREIGN PATENT DOCUMENTS

| CA | 2553584 A1 | 8/2005 |
|---|---|---|
| EP | 712025 A2 | 5/1996 |
| EP | 1715493 A1 | 10/2006 |
| JP | 11-101994 A | 4/1999 |
| JP | 2002-169192 A | 6/2002 |
| JP | 3428603 B2 | 5/2003 |
| JP | 2005-092183 A | 4/2005 |
| WO | 2005/071695 A1 | 8/2005 |
| WO | 2006/129429 A1 | 12/2006 |

OTHER PUBLICATIONS

European Search Report for Application No. 07743861.2-2205 / 2026122 PCT/JP2007060427 mailed Apr. 22, 2009.
International Search Report for International Application No. PCT/JP2007/060427; Date of mailing Aug. 7, 2007; with English translation.

* cited by examiner

*Primary Examiner*—William C Choi
(74) *Attorney, Agent, or Firm*—Cantor Colburn LLP (57) ABSTRACT

A display element comprising an electrolyte layer containing silver or a compound containing silver in a chemical structure thereof and a porous white scattering layer between opposed electrodes, and carrying out driving operation for the opposed electrodes to induce silver dissolution and deposition, wherein the porous white scattering layer is structured of at least 2 layers and an average particle diameter of main component particles forming a first layer is larger than that of main component particles forming a second layer, provided that a porous white scattering layer adjacent to the electrode is designated as the first layer and a porous white scattering layer, located on a side farther than the first layer when viewed from the electrode, is designated as the second layer.

9 Claims, 1 Drawing Sheet

FIG. 1

DISPLAY ELEMENT

CROSS REFERENCE TO RELATED APPLICATIONS

This is a U.S. national stage of application No. PCT/JP2007/060427, filed on 22 May 2007. Priority under 35 U.S.C. §119(a) and 35 U.S.C. §365(b) is claimed from Japanese Application No. 2006-154403, filed Jun. 2, 2006, the disclosure of which is also incorporated herein by reference.

TECHNICAL FIELD

The present invention relates to an electrochromic display element employing silver dissolution and deposition.

BACKGROUND

In recent years, with enhancement of operation speed of personal computers, widespread use of network infrastructure, and realization of mass storage of data, as well as cost reduction of data storage, there are increasing occasions in which information of documents and images, having been conventionally provided in the form of printed paper matter, is received and viewed as more convenient electronic information.

As viewing methods for such electronic information, there are mainly used those which are of light emitting types such as conventional liquid crystal display devices and CRTs, or organic EL display devices, which have recently been marketed. Especially, however, when electronic information is composed of items of document information, it is necessary to stare at these viewing devices for a relatively long time, which is certainly not viewer-friendly. It is commonly known that light emitting type display devices have disadvantages such as eye fatigue due to flicker, inconvenience of portability, limited reading posture, necessity to look closely at still images, and high power consumption due to the use of these devices for long-time reading.

As display devices to overcome these disadvantages, there are known (memory-type) reflective type display devices, which utilize external light, resulting in consuming no electrical power to retain images. However, these devices do not exhibit adequate performance due to the following reasons.

Namely, a system, employing a polarizing plate such as a reflective type liquid crystal, creates a problem in white display due to its low reflectance of approximately 40%, and most of the production methods of constituent members are neither simple nor easy. Further, polymer dispersion type liquid crystals require a high operating voltage and exhibit poor contrast of resultant images due to the utilization of a refractive index difference between the used organic compounds. Still further, polymer network type liquid crystals have problems such that high operating voltages result and complicated TFT circuits are required to enhance memory capability. Yet further, display elements employing electrophoresis require a high operating voltage of at least 10 V and tend to exhibit low operation life due to electrophoretic particle aggregation. In contrast, although being drivable at a low voltage of at most 3 V, electrochromic display elements have the disadvantage of exhibiting poor color quality of black or colors (such as yellow, magenta, cyan, blue, green, and red), as well as having the disadvantage that each display cell requires a complicated film structure such as a vapor deposition film to ensure memory capability.

As a display system to overcome any of the disadvantages in each of the systems described above, there is known an electrodeposition (hereinafter referred to simply as ED) system employing dissolution and deposition of a metal or metallic salt. The ED system is drivable at a low voltage of at most 3 V, and features advantages such as a simple cell structure and excellence in black and white contract, as well as in black image quality, resulting in disclosure of a variety of systems (for example, refer to Patent Documents 1-3).

The present inventor has made detailed investigation in the technologies disclosed in each of the Patent Documents described above, and found that these conventional technologies did not realize adequate reflectance during white display or display speed to meet current user needs. For example, as a control technology of the reflectance during white display, film thickness adjustment of a white scattering layer is cited. However, when the film thickness of the white scattering layer is small, display speed is enhanced, while the reflectance during white display is decreased due to insufficient light blocking. Further, when the film thickness of the white scattering layer is large, the reflectance during white display is enhanced, but in contrast the diffusion speed of an electrode reactant to an electrode becomes low, resulting in decreased display speed. Thereby, technology to enhance both the reflectance during white display and display speed has been desired.

Further, when an image with numerous halftones is displayed, display nonuniformity of gray results in degradation of its image quality level. Therefore, technology to prevent display nonuniformity has been ever more seriously desired than before.

Patent Document 1: U.S. Pat. No. 4,240,716 specification

Patent Document 2: Japanese Patent Publication No. 3428603

Patent Document 3: Unexamined Japanese Patent Application Publication No. 2003-241227

DISCLOSURE OF THE INVENTION

Problems to be Solved by the Invention

In view of the above problems, the present invention was achieved. An object of the present invention is to provide a display element exhibiting enhanced reflectance of white display and enhanced display speed, as well as less display nonuniformity.

Means to Solve the Problems

The object of the present invention was achieved employing the following constitutions.

Item 1. A display element comprising an electrolyte layer containing silver or a compound containing silver in a chemical structure thereof and a porous white scattering layer between opposed electrodes, and carrying out driving operation for the opposed electrodes to induce silver dissolution and deposition, wherein the porous white scattering layer is structured of at least 2 layers and an average particle diameter of main component particles forming a first layer is larger than that of main component particles forming a second layer, provided that a porous white scattering layer adjacent to the electrode is designated as the first layer and a porous white scattering layer, located on a side farther than the first layer when viewed from the electrode, is designated as the second layer.

Item 2. The display element described in item 1 above, wherein the main component particles forming the first layer is a metal oxide featuring an average particle diameter of 100 nm-1,000 nm, and the main component particles forming the second layer is a metal oxide featuring an average diameter of 5 nm-50 nm.

Item 3. The display element described in item 1 or 2 above, wherein the metal oxide is titanium oxide.

Item 4. The display element described in any one of items 1-3 above, wherein an average film thickness of the first layer is 0.1 μm-10 μM.

Item 5. The display element described in item 3 or 4 above, wherein a particle surface of titanium oxide constituting the first layer is covered with an electrically conductive compound.

Item 6. The display element described in item 5 above, wherein the electrically conductive compound is tin oxide doped with antimony.

Item 7. The display element described in any one of items 1-6 above, wherein a sum of average film thicknesses of the porous white scattering layers is 15 μm-300 μm.

Item 8. The display element described in any one of items 1-7 above, wherein the porous white scattering layers are subjected to a firing treatment at a temperature of at least 120° C.

Item 9. The display element described in any one of items 1-8 above, wherein a reflectance during white display is 40%-90%.

Effects of the Invention

According to the present invention, a display element exhibiting enhanced reflectance during white display and enhanced display speed, as well as less display nonuniformity was able to be provided.

DESCRIPTION OF THE NUMERIC DESIGNATIONS 1, 2: electrode
3: electrolyte
4: porous white scattering layer
5: main component particle of a large particle diameter
6: first layer
7: main component particle of a small particle diameter
8: second layer

BEST MODE TO CARRY OUT THE INVENTION

The best mode to carry out the present invention will now be detailed.

In view of the above problems, the present inventor conducted diligent investigations and realized the following: in a display element having an electrolyte layer, incorporating silver or a compound containing silver in its chemical structure and a porous white scattering layer between opposed electrodes; and carrying out driving operation for the opposed electrodes to induce silver dissolution and deposition, via a display element wherein the porous white scattering layer was structured of at least 2 layers and then the average particle diameter of a main component particle forming a first layer was larger than that of a main component particle forming a second layer, provided that a porous white scattering layer adjacent to an electrode was designated as the first layer and a porous scattering white layer, located on a side farther than the first layer when viewed from the electrode, was designated as the second layer, there was realized a display element having a simple member structure, being drivable at low voltages, and exhibiting enhanced display contract and white display reflectance, as well as achieving the rapid disappearance of silver images by sufficiently providing an electrolyte, through fine pores provided, to silver images partly formed during black display in the porous white scattering layer and between the opposed electrodes when black display was converted to white display, resulting in a display element exhibiting enhanced reflectance of white display and enhanced display speed, as well as less display nonuniformity.

The present invention will now be detailed.

The display element of the present invention is an ED system display element having an electrolyte, incorporating silver or a compound containing silver in its chemical structure, between opposed electrodes, and carrying out driving operation for the opposed electrodes to induce silver dissolution and deposition.

[Silver or a Compound Containing Silver in its Chemical Structure]

Silver or a compound containing silver in its chemical structure according to the present invention is a common designation of a compound including, for example, silver oxide, silver sulfide, metallic silver, silver colloidal particles, a silver halide, a silver complex compound, and silver ion. The phase states such as a solid state, a solubilized state in liquid, or a gas state, and the charge state types such as neutral, anionic, or cationic need not be specifically considered.

[Display Element Structure]

Figure 1:
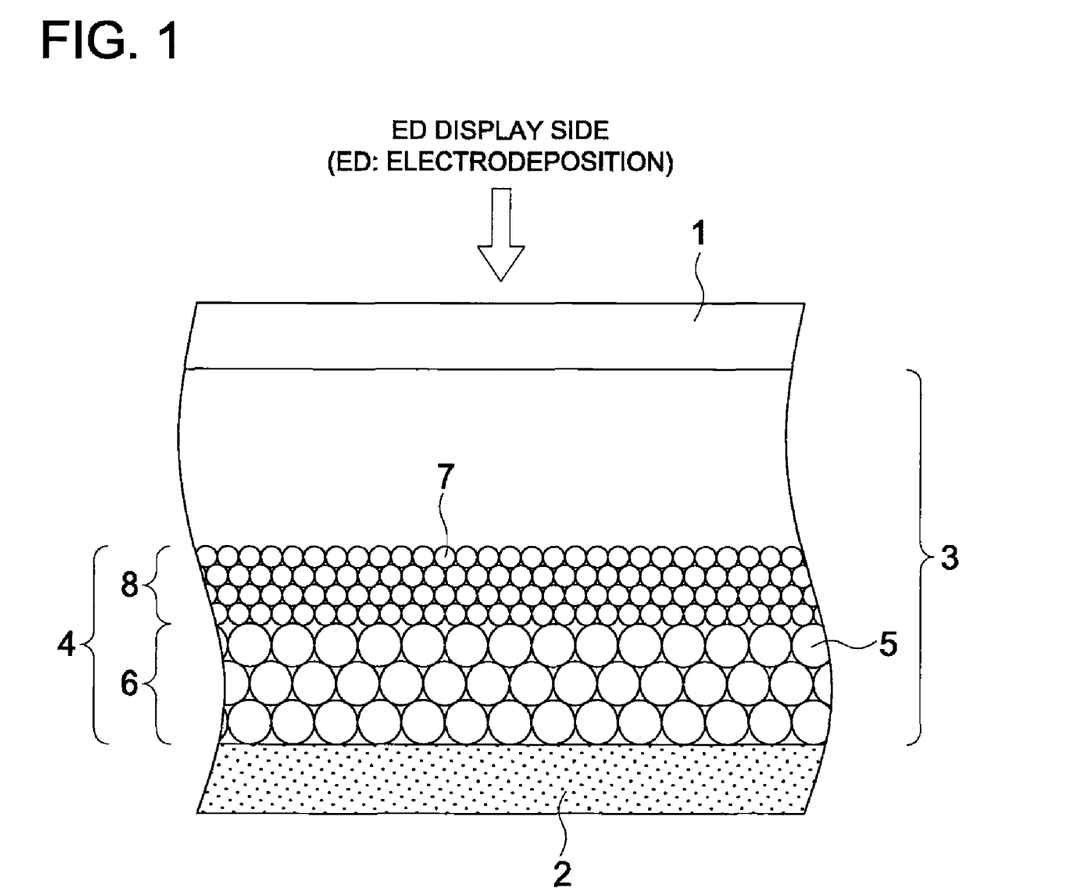
FIG. 1 A schematic cross-sectional view showing one example of a fundamental structure of the display element of the present invention

FIG. 1 is a schematic cross-sectional view showing one example of a fundamental structure of the display element of the present invention.

In FIG. 1, the ED display section is provided with a pair of opposed electrodes arranged in an opposed position to each other. Electrode 1, one of the opposed electrodes, close to the ED display section is provided with a transparent electrode such as an ITO electrode, and the other, electrode 2, is provided with a metal electrode such as a silver electrode. Electrolyte 3, incorporating silver or a compound containing silver in its chemical structure, is arranged between electrode 1 and electrode 2. By applying voltage of positive and negative polarity between the opposed electrodes, oxidation-reduction reaction of silver is performed on electrode 1 and electrode 2, whereby a black silver image in the reduction state and a transparent silver state in the oxidation state can reversibly be converted.

In the display element of the present invention, of a pair of the opposed electrodes, on electrode 2 on the non-display section side, porous white scattering layer 4 of at least 2 layers, in which at least 2 types of metal oxide particles of different average particle diameters are laminated, is arranged, in order to enhance display contract and the reflectance during white display.

Porous white scattering layer 4 is an extremely effective member from the viewpoint of enhancing display contract and the reflectance during white display. During black display, silver is deposited via reduction of silver ions on the surface of electrode 1, and the deposited silver is oxidized on the surface of electrode 2 to form silver ions, resulting in realization of an electrochemical system. Further, during white display, the deposited silver is oxidized on the surface of electrode 1 to form silver ions, and the silver ions are reduced on the surface of electrode 2 to deposit silver, leading to another electrochemical system. For example, when a metal oxide particle of a small particle diameter is used to enhance the reflectance of a porous white scattering layer during white display, the space (void ratio) between porous white scattering layer 4 and electrode 2 becomes extremely small, and therefore, during black display, silver ions produced between porous white scattering layer 4 and electrode 2 are inadequately diffused from the surface of electrode 2 toward the side of electrode 1, resulting in decreased black display speed. Further, during white display, silver ions serving as a reactant to the surface of electrode 2 are inadequately diffused, leading to decreased white display speed.

In contrast, by using a metal oxide of a sufficiently large size, the space between porous white scattering layer 4 and electrode 2 ensures a sufficient volume, and then dissolution of deposited silver and deposition reaction of silver ions are promoted. However, use of such a metal oxide of a large particle diameter makes it impossible to realize the desired display contrast and reflectance during white display.

In the present invention, to overcome the above trade-off problem, on one electrode, being electrode 2 (non-display side electrode), first layer 6 incorporating main component particle 5 of a relatively large average particle diameter is formed, and thereon, second layer 8 incorporating main component particle 7 of a relatively small particle diameter compared to main component particle 5 is structured. By employing such a structure, sufficient voids are ensured between electrode 2 and first layer 6, and also in first layer 6 structured of main component particle 5 of a relatively large average particle diameter, diffusion paths for reactants and products are adequately ensured, whereby the reactants and products can sufficiently move through these diffusion paths. Especially, an effect of the present invention is remarkably produced on display nonuniformity during gray image display. In contrast, the second layer, when being structured of main component particle 7 of a relatively small particle diameter, was able to realize adequate reflectance during white display, and also when the resistance value of the entire porous white scattering layer was allowed to decrease, both display non-uniformity resistance and display speed were able to be enhanced simultaneously. In the display element of the present invention, the reflectance during white display ranges from 40%-90%.

[Porous White Scattering Layer]

The display element of the present invention incorporates a porous white scattering layer structured of at least 2 layers from the viewpoint of enhancing display contrast and white display reflectance.

Plural porous white scattering layers according to the present invention each can be formed using a main component particle, which is preferably a dispersion containing a metal oxide, a dispersion solvent, a fluorescent brightener, and a polymer via a coating method, ink-jet method, or common printing method. Of these, formation employing a screen printing method is preferable.

The porous white scattering layer of the present invention is structured of at least 2 layers, and a first layer is formed adjacent to an electrode (non-display side electrode). A second layer is arranged on a side farther than the first layer when viewed from the electrode. In this case, the second layer may be adjacent or unadjacent to the first layer, but there is preferable a structure having the adjacent relationship among the electrode, the first layer, and the second layer as shown in FIG. 1. Incidentally, the first layer and the second layer referred to in the present invention are collectively referred to as "layer", even when both thereof are in a plurally laminated state of metal oxide particles featuring the same characteristics (for example, average particle diameter). Therefore, it is unnecessary to form a state where a single layer is formed by singly arranging a metal oxide particle.

In the structure of the porous white scattering layer of the present invention, dispersions forming a first layer and a second layer each incorporate particles (metal oxide particles) of different average particle diameters as main components. The main component referred to in the present invention refers to a component (particle) constituting at least 75% of the porous white scattering layer, preferably a component constituting at least 90% thereof.

One of the features of the display element of the present invention is that the average particle diameter of a metal oxide particle forming a first layer arranged adjacent to electrode 2 is larger than that of a metal oxide particle forming a second layer located on the upper side than the first layer.

Average particle diameter measurement of the metal oxide particle of the present invention is carried out with a commercially available particle diameter analyzer employing a light scattering method, an electrophoretic method, or a laser Doppler method. It is also possible to conduct measurement via photographic particle images of at least 100 particles using a transmission electron microscope, followed by statistically processing these images using an image analyzing software such as Image-Pro (produced by Media Cybernetics, Inc.).

In the present invention, the average film thickness of a first layer is preferably in the range of 0.1 µm-10 µm. Further, the total average film thickness of each of the layers in a porous white scattering layer structured of plural layers is preferably in the range of 15 µm-300 µm, preferably in the range of 20 µm-30 µm.

As main component particles constituting the porous white scattering layer of the present invention, there may be used, for example, titanium dioxide (anatase or rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metallic salts, talc, kaolin, zeolite, acid clay, glass, and organic compounds such as polyethylene, polystyrene, acryl resins, ionomers, ethylene-vinyl acetate copolymeric resins, benzoguanamine resins, urea-formaldehyde resins, melamine-formaldehyde resins, or polyamide resins. These substances may be uses individually or in combination, or in the form in which voids, capable of varying the refractive index, are contained in the particles.

In the present invention, of the above particles, a metal oxide particle featuring an average particle diameter ranging from 100 nm-1000 nm is preferable as a main component particle incorporated in a dispersion forming a first layer, but a main component particle featuring an average particle diameter ranging from 200 nm-300 nm is more preferable. Further, as a main component particle incorporated in a dispersion forming a second layer, a metal oxide particle featuring an average particle diameter ranging from 5 nm-50 nm is preferable. Still further, as the metal oxide, titanium oxide is preferably used from the viewpoint of realizing adequate contrast and enhanced reflectance during white display, that is, one of the targeted effects of the present invention, and titanium oxide surface-treated with an inorganic oxide (e.g., $Al_2O_3$, AlO(OH), or $SiO_2$) or an organic substance such as a polyhydric alcohol is specifically used.

Further, as a metal oxide used to form the first layer of the present invention, titanium oxide, the particle surface of which is covered with an electrically conductive compound, is preferably used from the viewpoint of realizing further enhanced display speed.

The electrically conductive compound, covering the particle surface of titanium oxide, is not specifically limited.

Metal such as gold, silver, or copper, and a metal oxide can appropriately be used, including, for example, a metal oxide prepared by doping an element such as Al, Ga, B, In, Y, Sc, F, V, Si, Ge, Ti, Zr, Hf, Sn, Mo, Nb, Ta, W, Te, Sb, or Bi into a binary compound such as ZnO, CdO, $In_2O_3$, $SnO_2$, $PbO_2$, or $Ga_2O_3$; or a metal oxide by prepared by doping various elements into various ternary compounds or polycentric compounds, but from the viewpoint of further producing the targeted effects of the present invention, tin oxide doped with antimony (Sb) is more preferable.

As the metal oxide, any one of indium oxide, tin oxide, and a metal oxide doped with antimony or phosphor atoms is preferably used, including any appropriate combinations thereof, but tin oxide is specifically preferably used. As tin oxide, stannous oxide (SnO) and stannic oxide ($SnO_2$) are known, but stannic oxide is preferably used in the present invention.

As solvents used for a dispersion forming the porous white scattering layer of the present invention, there can be used, for example, water, toluene, xylene, ethanol, propanol, butanol, acetonitrile, acetylacetone, terpineol, butylcarbitol, and butylcarbitol acetate.

As polymers applicable to the present invention, there can be listed, for example, protein such as gelatin, or gelatin derivatives; cellulose derivatives; natural compounds including polysaccharides such as starch, gum arabic, dextran, pullulan, carageenan; and synthetic polymers such as polyvinyl alcohol, polyethylene glycol, polyvinyl pyrrolidone, acrylamide polymers, or derivatives thereof. The gelatin derivatives include acetyl gelatin and phthalic gelatin. The polyvinyl alcohol derivatives include terminal alkyl group-modified polyvinyl alcohol and terminal mercapto group-modified polyvinyl alcohol. The cellulose derivatives include hydroxyethyl cellulose, hydroxypropyl cellulose, and carboxymethyl cellulose. In addition, there are also usable those described in Research Disclosure and on pages 71-75 of Unexamined Japanese Patent Application Publication (hereinafter referred to as JP-A) No. 64-13546; highly water-absorbing polymers, described in U.S. Pat. No. 4,960,681 and JP-A No. 62-245260, that is, homopolymers of vinyl monomers containing —COOM or —$SO_3$M (wherein M is a hydrogen atom or an alkali metal), or copolymers of these monomers or copolymers of the same with other monomers (for example, sodium methacrylate, ammonium methacrylate, or potassium acrylate). These binders may be used in combinations of at least 2 types.

In the present invention, a medium to coat the above dispersion is applied anywhere on a component between the opposed electrodes of a display element, but is preferably applied on the surface of at least one of the opposed electrodes.

Any method of drying a solvent in the dispersion applied on the electrode may be employable provided that the method can evaporate the solvent. For example, heating from a heating source, a heating method using infrared radiation, and a heating method via electromagnetic induction can be listed. Further, evaporation may be carried out under reduced pressure.

The term "porous" referred to in the present invention is of a penetrating state capable of inducing silver dissolution and deposition reaction and enabling ion species to move between electrodes, wherein a porous white scattering substance is formed by coating and drying the dispersion on an electrode, and an electrolyte liquid incorporating silver or a compound containing silver in its chemical structure is applied on the scattering substance, followed by being sandwiched with opposed electrodes to produce a potential difference between the opposed electrodes.

In the display element of the present invention, during coating and drying of the dispersion or after drying thereof, the above polymer is preferably hardened using a hardener.

As examples of hardeners used in the present invention, there are listed, for example, hardeners described in column 41 of U.S. Pat. No. 4,678,739, ibid. No. 4,791,042, and JP-A Nos. 59-116655, 62-245261, 61-18942, 61-249054, 61-245153, and 4-218044. More specifically, there are exemplified aldehyde based hardeners (e.g. formaldehyde), aziridine based hardeners, epoxy based hardeners, vinyl sulfone based hardeners (e.g., N,N'-ethylene-bis(vinylsulfonylacetamido)ethane), N-methylol based hardeners (e.g., dimethylol urea), boric acid, metaboric acid, or polymer hardeners (compounds described, for example, in JP-A No. 62-234157). When gelatin is used as a polymer, of these hardeners, a vinyl sulfone based hardener and a chlorotriazine based hardener are preferably used individually or in combination. Further, when a polyvinyl alcohol is used, a boron-containing compound such as boric acid or metaboric acid is preferably used.

There are used 0.001-1 g of, preferably 0.005-0.5 g of these hardeners per polymer. Further, to enhance film strength, it is optionally possible to carry out heat treatment or moisture controlling during hardening reaction.

In the display element of the present invention, after being formed, the porous white scattering layer according to the present invention is preferably subjected to a firing treatment at a temperature of at least 120° C., from the viewpoint that the porous white scattering layer exhibiting excellent display speed is formed since electrical conductivity is enhanced via a fusing effect of a metal oxide. The above temperature is not unconditionally specified but approximately at most 300° C., depending on the type of the metal oxide used.

[Electrolyte Additives]

In the display element of the present invention, an electrolyte preferably incorporates at least one type of compound represented by Formula (1) or (2) and at least one type of compound represented by Formula (3) or (4).

Formula (1)

In Formula (1), L is an oxygen atom or $CH_2$, and $R_1$-$R_4$ each represent a hydrogen atom, an alkyl group, an alkenyl group, an aryl group, a cycloalkyl group, an alkoxyalkyl group, or an alkoxy group.

Formula (2)

In Formula (2), $R_5$ and $R_6$ are each a hydrogen atom, an alkyl group, an alkenyl group, an aryl group, a cycloalkyl group, an alkoxyalkyl group, or an alkoxy group.

Formula (3)

In Formula (3), $R_7$ and $R_8$ are each a substituted or unsubstituted hydrocarbon group, but are not an aromatic group when a ring containing an S atom is formed.

Formula (4)

In Formula (4), M is a hydrogen atom, a metallic atom, or a quaternary ammonium, Z is a nitrogen-containing heterocycle, and n represents an integer of 0-5. $R_9$ is a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group, or a heterocyclic group. When n is at least 2, $R_9$ each may be the same or different and each may join to form a condensed ring.

Initially, the compound represented by Formula (1) will now be described.

In Formula (1), L is an oxygen atom or $CH_2$, and $R_1$-$R_4$ are each a hydrogen atom, an alkyl group, an alkenyl group, an aryl group, a cycloalkyl group, an alkoxyalkyl group, or an alkoxy group.

An alkyl group includes, for example, a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group. An aryl group includes, for example, a phenyl group and a naphthyl group. A cycloalkyl group includes, for example, a cyclopentyl group and a cyclohexyl group. An alkoxyalkyl group includes, for example, a methoxyethyl group and a γ-methoxypropyl group. An alkoxy group includes, for example, a methoxy group, an ethoxy group, a propyloxy group, a pentyloxy group, a hexyloxy group, an octyloxy group, and a dodecyloxy group.

Specific examples of the compound represented by Formula (1) will now be cited, but the present invention is not limited to these exemplified compounds only.

1-1

1-2

1-3

1-4

1-5

Secondly, the compound represented by Formula (2) will now be described.

In Formula (2), $R_5$ and $R_6$ are each a hydrogen atom, an alkyl group, an alkenyl group, an aryl group, a cycloalkyl group, an alkoxyalkyl group, or an alkoxy group.

An alkyl group includes, for example, a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group. An aryl group includes, for example, a phenyl group and a naphthyl group. A cycloalkyl group includes, for example, a cyclopentyl group and a cyclohexyl group. An alkoxyalkyl group includes, for example, a methoxyethyl group and a γ-methoxypropyl group. An alkoxy group includes, for example, a methoxy group, an ethoxy group, a propyloxy group, a pentyloxy group, a hexyloxy group, an octyloxy group, and a dodecyloxy group.

Specific examples of the compound represented by Formula (2) will now be cited, but the present invention is not limited to these exemplified compounds only.

2-1

2-2

2-3

Of these exemplified compounds represented by Formula (1) and Formula (2), the exemplified compounds (1-1), (1-2), and (2-3) are specifically preferable.

The compounds represented by Formulas (1) and (2) are included in a kind of electrolyte solvent, being able to be further used together with other solvents in the display element of the present invention, to the extent that the targeted effects of the present invention are not adversely affected. Specifically, there can be listed tetramethylurea, sulforan, dimethylsulfoxide, 1,3-dimethyl-2-imidazolidinone, 2-(N-methyl)-2-pyrrolidinone, hexamethylphospholtriamide, N,N-dimethylpropioneamide, N-methylacetamide, N-methylacetamide, N,N-dimethylformamide, N-methylformamide, butylonitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxyethane, diethoxyfuran, tetrahydrofuran, ethylene glycol, diethylene glycol, triethylene glycol monobutyl ether, and water. Of these solvents, at least one type of solvent, featuring a freezing point of at most −20° C. and a boiling point of at least 120° C., is preferably contained.

Solvents employable in the present invention include compounds described in J. A. Riddick, W. B. Bunger, T. K. Sakano, "Organic Solvents", 4th ed., John Wiley & Sons (1986); Y. Marcus, "Ion Solvation", John Wiley & Sons (1985); C. Reichardt, "Solvents and Solvent Effects in Chemistry", 2nd ed., VCH (1988); and G. J. Janz, R. P. T. Tomkins, "Nonaqueous Electrolytes Handbook", Vol. 1., Academic Press (1972).

In the present invention, the electrolyte solvent may be a single kind of solvent or a solvent mixture. However, a mixed solvent containing ethylene carbonate is preferable. The amount of ethylene carbonate added is preferably from 10% by weight—90% by weight based on the total electrolyte solvent weight. A specifically preferable electrolyte solvent is a mixed solvent of propylene carbonate/ethylene carbonate at a weight ratio of 7/3-3/7. When the propylene carbonate ratio is more than 7/3, poor ion conductivity is exhibited, resulting in decreased response speed. When the ratio is less than 3/7, an electrolyte tends to be deposited at low temperatures.

In the display element of the present invention, a compound represented by Formula (1) or (2) and a compound represented by Formula (3) or (4) are preferably used together.

In Formula (3), $R_7$ and $R_8$ are each a substituted or unsubstituted hydrocarbon, which has a straight chain group or branched group. Further, such a hydrocarbon may contain at least one nitrogen atom, oxygen atom, phosphor atom, sulfur atom, or halogen atom, however, being not an aromatic group when a ring having an S atom is formed.

As a group with which the hydrocarbon group is substituted, there can be listed, for example, an amino group, a guanidine group, a quaternary ammonium group, a hydroxyl group, a halogen compound, a carbonic acid group, a carboxylate group, an amide group, a sulfinic acid group, a sulfonic acid group, a sulfate group, a phosphonic acid group, a phosphate group, a nitro group, and a cyano group.

Generally, to induce silver dissolution and deposition, it is necessary to allow silver to be soluble in an electrolyte. For example, it is common to utilize a method of converting silver or a compound containing silver into a solubilized substance by producing a coordinate bond with silver; or via coexistence with a compound containing a chemical structure species exhibiting interaction with silver, in which a loose covalent bond with silver is created. As the chemical structure species, there are known a halogen atom, a mercapto group, a carboxyl group, and an imino group. In the present invention, a thioether group also effectively acts as a silver solvent and exhibits features such as minimal effects to a coexisting compound and high solubility in a solvent.

Specific examples of the compound represented by Formula (3) will now be listed, but the present invention is not limited to the exemplified compounds.

3-1: $CH_3SCH_2CH_2OH$
3-2: $HOCH_2CH_2SCH_2CH_2OH$
3-3: $HOCH_2CH_2SCH_2CH_2SCH_2CH_2OH$
3-4: $HOCH_2CH_2SCH_2CH_2SCH_2CH_2SCH_2CH_2OH$
3-5: $HOCH_2CH_2SCH_2CH_2OCH_2CH_2OCH_2CH_2SCH_2CH_2OH$
3-6: $HOCH_2CH_2OCH_2CH_2SCH_2CH_2SCH_2CH_2OCH_2CH_2OH$
3-7: $H_3CSCH_2CH_2COOH$
3-8: $HOOCCH_2SCH_2COOH$
3-9: $HOOCCH_2CH_2SCH_2CH_2COOH$
9-10: $HOOCCH_2SCH_2CH_2SCH_2COOH$
3-11: $HOOCCH_2SCH_2CH_2SCH_2CH_2SCH_2CH_2SCH_2COOH$
3-12: $HOOCCH_2CH_2SCH_2CH_2SCH_2CH(OH)CH_2SCH_2CH_2SCH_2CH_2COOH$
3-13: $HOOCCH_2CH_2SCH_2CH_2SCH_2CH(OH)CH(OH)CH_2SCH_2CH_2SCH_2CH_2COOH$
3-14: $H_3CSCH_2CH_2CH_2NH_2$
3-15: $H_2NCH_2CH_2SCH_2CH_2NH_2$
3-16: $H_2NCH_2CH_2SCH_2CH_2SCH_2CH_2NH_2$
3-17: $H_3CSCH_2CH_2CH(NH_2)COOH$
3-18: $H_2NCH_2CH_2OCH_2CH_2SCH_2CH_2SCH_2CH_2OCH_2CH_2NH_2$
3-19: $H_2NCH_2CH_2SCH_2CH_2OCH_2CH_2OCH_2CH_2SCH_2CH_2NH_2$
3-20: $H_2NCH_2CH_2SCH_2CH_2SCH_2CH_2SCH_2CH_2SCH_2CH_2NH_2$
3-21: $HOOC(NH_2)CHCH_2CH_2SCH_2CH_2SCH_2CH_2CH(NH_2)COOH$
3-22: $HOOC(NH_2)CHCH_2SCH_2CH_2OCH_2CH_2OCH_2CH_2SCH_2CH(NH_2)COOH$
3-23: $HOOC(NH_2)CHCH_2OCH_2CH_2SCH_2CH_2SCH_2CH_2OCH_2CH(NH_2)COOH$
3-24: $H_2N(=O)CCH_2SCH_2CH_2OCH_2CH_2OCH_2CH_2SCH_2C(=O)NH_2$
3-25: $H_2N(O=)CCH_2SCH_2CH_2SCH_2C(O=)NH_2$
3-26: $H_2NHN(O=)CCH_2SCH_2CH_2SCH_2C(O=)NHNH_2$
3-27: $H_3C(O=)NHCH_2CH_2SCH_2CH_2SCH_2CH_2NHC(O=)CH_3$
3-28: $H_2NO_2SCH_2CH_2SCH_2CH_2SCH_2CH_2SO_2NH_2$
3-29: $NaO_3SCH_2CH_2CH_2SCH_2CH_2SCH_2CH_2CH_2SO_3Na$
3-30: $H_3CSO_2NHCH_2CH_2SCH_2CH_2SCH_2CH_2NHO_2SCH_3$
3-31: $H_2N(NH)CSCH_2CH_2SC(NH)NH_2 \cdot 2HBr$
3-32: $H_2N(NH)CSCH_2CH_2OCH_2CH_2OCH_2CH_2SC(NH)NH_2 \cdot 2HCl$
3-33: $H_2N(NH)CNHCH_2CH_2SCH_2CH_2SCH_2CH_2NHC(NH)NH_2 \cdot 2HBr$
3-34: $[(CH_3)_3NCH_2CH_2SCH_2CH_2SCH_2CH_2N(CH_3)_3]^{2+} \cdot 2Cl^-$

3-35

3-36

3-37

3-38

3-39

3-40

3-41

3-42

3-43

3-44

3-45

3-46

3-47

Of these exemplified compounds, the exemplified compound 3-2 is specifically preferable from the viewpoint of sufficiently producing the targeted effects of the present invention.

Then, the compound represented by Formula (4) will now be described.

In above Formula (4), M is a hydrogen atom, a metallic atom, or a quaternary ammonium. Z is a nitrogen-containing heterocycle, and n is an integer of 0-5. $R_9$ is a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group, or a heterocyclic group. When n is at least 2, $R_9$ each may be the same or different and each may join to form a condensed ring.

The metallic atom represented by M in Formula (4) includes, for example, Li, Na, K, Mg, Ca, Zn, and Ag. The quaternary ammonium includes, for example, $NH_4$, $N(CH_3)_4$, $N(C_4H_9)_4$, $N(CH_3)_3C_{12}H_{25}$, $N(CH_3)_3C_{16}H_{33}$, and $N(CH_3)_3CH_2C_6H_5$.

The nitrogen-containing heterocycle represented by Z in Formula (4) includes, for example, a tetrazole ring, a triazole ring, an imidazole ring, an oxadiazole ring, a thiadiazole ring, an indole ring, an oxazole ring, a benzoxazole ring, a benzimidazole ring, a benzothiazole ring, a benzoselenazole ring, and a naphthoxazole ring.

The halogen atom represented by $R_9$ in Formula (4) includes, for example, a fluorine atom, a chlorine atom, a bromine atom, and an iodine atom. The alkyl group represented thereby includes, for example, a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group. The aryl group includes, for example, a phenyl group and a naphthyl group. The alkylcarbonamide group includes, for example, an acetylamino group, a propionylamino group, and a butyroylamino group. The arylcarbonamide group includes, for example, a benzoylamino group. The alkylsulfonamide group includes, for example, a methanesulfonylamino group and an ethanesulfonylamino group. The arylsulfonamide group includes, for example, a benzenesulfonylamino group and a toluenesulfonylamino group. The aryloxy group includes, for example, a phenoxy group. The alkylthio group includes, for example, a methylthio group, an ethylthio group, and a butylthio group. The arylthio group includes, for example, a phenylthio group and a tolylthio group. The alkylcarbamoyl group includes, for example, a methylcarbamoyl group, a dimethylcarbamoyl group, an ethylcarbamoyl group, a diethylcarbamoyl group, a dibutylcarbamoyl group, a piperidylcarbamoyl group, and a morpholylcarbamoyl group. The arylcarbamoyl group includes, for example, a phenylcarbamoyl group, a methylphenylcarbamoyl group, an ethylphenylcarbamoyl group, and a benzylphenylcarbamoyl group. The alkylsulfamoyl group includes, for example, a methylsulfamoyl group, a dimethylsulfamoyl group, an ethylsulfamoyl group, a diethylsulfamoyl group, a dibutylsulfamoyl group, a piperidylsulfamoyl group, and a morpholylsulfamoyl group. The arylsulfamoyl group includes, for example, a phenylsulfamoyl group, a methylphenylsulfamoyl group, an ethylphenylsulfamoyl group, and a benzylphenylsulfamoylgroup. The alkylsulfonyl group includes, for example, a methanesulfonyl group and an ethanesulfonyl group. The arylsulfonyl group includes, for example, a phenylsulfonyl group, a 4-chlorophenylsulfonyl group, and a p-toluenesulfonyl group. The alkoxycarbonyl group includes, for example, a methoxycarbonyl group, an ethoxycarbonyl group, and a butoxycarbonyl group. The aryloxycarbonyl group includes, for example, a phenoxycarbonyl group. The alkylcarbonyl group includes, for example, an acetyl group, a propionyl group, and a butyroyl group. The arylcarbonyl group includes, for example, a benzoyl group and an alkylbenzoyl group. The acyloxy group includes, for example, an acetyloxy group, a propionyloxy group, and a butyroyloxy group. The heterocyclic group includes, for example, an oxazole ring, a thiazole ring, a triazole ring, a selenazole ring, a tetrasol ring, an oxadiazole ring, a thiadiazole ring, a thiazin ring, a benzoxazole ring, a benzothiazole ring, an indolenine ring, a benzoselenazole ring, a naphthothiazole ring, a triazaindolizine ring, a diazaindolizine ring, and a tetraazaindolizine ring. These substituents may further have a substituent.

Specific examples, which are preferable, of the compound represented by Formula (4) will now be listed that by no means limit the scope of the present invention.

4-1

4-2

4-3

4-4

4-5

4-6

4-7

4-8

4-9

4-10

4-11

-continued 4-12
4-13
4-14
4-15
4-16
4-17
4-18
4-19

Of these exemplified compounds, the exemplified compounds 4-12 and 4-18 are specifically preferable from the viewpoint of sufficiently producing the targeted effects.

[Halogen Ion/Silver Ion Concentration Ratio]

In the display element of the present invention, the condition specified by following Expression (1) is preferably satisfied, provided that the molar concentration of a halogen ion or halogen atom contained in an electrolyte is [X](mol/kg); and the total molar concentration of silver or silver, contained in a compound containing the silver in its chemical structure, contained in the electrode is [Ag] (mol/kg).

$$0 \leqq [X]/[Ag] \leqq 0.01 \quad \text{Expression (1)}$$

The halogen atom referred to in the present invention refers to an iodine atom, a chlorine atom, a bromine atom, or a fluorine atom. When [X]/[Ag] is more than 0.01, $X^- \rightarrow X_2$ is induced during oxidation-reduction reaction of silver, and then $X_2$ dissolves blackened silver by readily undergoing cross-oxidation with the blackened silver, which becomes one of the factors decreasing memory capability. Therefore, the molar concentration of a halogen atom is preferably as low as possible with respect to that of silver. In the present invention, the relationship of $0 \leqq [X]/[Ag] \leqq 0.001$ is more preferable. When halogen ions are added, with regard to the halogen species, the sum of the molar concentration of each of the halogen species is preferably [I]<[Br]<[Cl]<[F] from the viewpoint of enhancing memory capability.

[Electrolyte-Silver Salt]

In the display element of the present invention, there can be used silver salt compounds known in the art such as silver iodide, silver chloride, silver bromide, silver oxide, silver sulfide, silver citrate, silver acetate, silver behenate, silver p-toluenesulfonate, silver salts of mercapto compounds, and silver complexes of iminodiacetic acids. Of these, it is preferable to use, as silver salts, compounds without a nitrogen atom exhibiting coordination capability with a halogen, carboxylic acid, or silver, and for example, silver p-toluenesulfonate is preferable.

The concentration of silver ions contained in the electrolyte of the present invention is preferably in the range of 0.2 mol/kg$\leqq$[Ag]$\leqq$2.0 mol/kg. When the silver ion concentration is less than 0.2 mol/kg, a diluted silver solution is formed to lower the driving rate, while when it exceeds 2 mol/kg, solubility is degraded, which tends to result in inconvenience of deposition during low temperature storage.

In the display element of the present invention, in addition to the components described above, various constituent layers may be provided, if appropriate.

[Porous Electrode Incorporating a Metal Oxide]

Further, in the display element of the present invention, a porous electrode incorporating a metal oxide can also be used.

In the display element of the present invention, it was found that when, of the opposed electrodes, the electrode on the side of no image observation was protected with a porous electrode incorporating a metal oxide, oxidation-reduction reaction of silver or a compound containing silver in its chemical structure on the side of no image observation occurred on or within the porous electrode incorporating the metal oxide. Accordingly, the option of selecting the type of the electrode on the side of no image observation can be broadened and the durability thereof can be enhanced.

A metal oxide constituting the porous electrode of the present invention includes, for example, titanium oxide, silicon oxide, zinc oxide, tin oxide, Sn-doped indium oxide (ITO), antimony-doped tin oxide (ATO), fluorine-doped tin oxide (FTO), and aluminum-doped zinc oxide, or a mixture thereof.

The porous electrode is formed via bonding or contacting of plural particles of any of the above metal oxide. The average particle diameter of the metal oxide fine particles is preferably 5 nm-10 µm, more preferably 20 nm-1 µm. Further, the specific surface area of the metal oxide particles is preferably $1 \times 10^{-3}$-$1 \times 10^2$ m$^2$/g, more preferably $1 \times 10^{-2}$-10 m$^2$/g. Still further, any appropriate shape such as the amorphous, acicular, or spherical one is employable as the shape of the metal oxide particles.

As the forming or bonding method of metal oxide particles, a sol-gel method and a firing method known in the art are employable, including, methods described, for example, in 1) Journal of the Ceramic Society of Japan, 102, 2, P 200 (1994), 2) Yogyo Kyokai Shi, 90, 4, p 157, and 3) J. of Non-Cryst. Solids, 82, 400 (1986). Further, there can be used a method in which titanium oxide dendrimer particles prepared using a gas phase method are coated on a substrate via dispersion on a solution and then a solvent is removed by drying at a temperature of about 120—about 150° C. to obtain a porous electrode. The metal oxide particles are preferably in the state of being bonded, and further in the state where a resistance of at least 0.1 g, preferably at least 1 g, is exhibited, based on measurement using a continuous weight surface measurement system (e.g., a scratch tester).

The term "porous" referred to in the present invention is of a penetrating state where a porous electrode is arranged and then a potential difference is produced between opposed electrodes, which enables induction of silver dissolution and deposition reaction and enables ion species to move in the porous electrode.

[Electron Insulating Layer]

In the display element of the present invention, an electron insulating layer can be provided.

It is only necessary for an electron insulating layer applicable to the present invention to be a layer exhibiting ion conductivity as well as electron insulating properties. There are listed, for example, a solid electrolyte film in the form of film of a polymer with a polar group or a salt; a pseudo-solid electrolyte film composed of a porous film, exhibiting high electron insulating properties, in the voids of which an electrolyte is held; a polymer porous film having voids; and a porous body of an inorganic material such as a silicon-containing compound featuring a low specific dielectric constant.

As a forming method of a porous film, there can be used any appropriate method known in the art such as a firing method (fusing method) (utilizing pores created among particles prepared by partially fusing polymer fine particles or inorganic particles via addition of a binder); an extraction method (in which a constituent layer is formed using an organic or inorganic substance soluble in a solvent and a binder insoluble in the solvent, followed by dissolving the organic or inorganic substance with the solvent to obtain fine pores); a foaming method of allowing a high molecular weight polymer to foam by heating or degassing; a phase conversion method of allowing a mixture of polymers to be phase-separated by use of a good solvent and a poor solvent; and a radiation exposure method of forming pores via exposure of various kinds of radiations. Specifically, there can be listed the electron insulating layers described in JP-A Nos. 10-30181, 2003-107626; Examined Japanese Patent Application Publication No. 7-95403; and Japanese Patent Publication Nos. 2635715, 2849523, 2987474, 3066426, 3464513, 3483644, 3535942, and 3062203.

[Electrolyte Materials]

In the display element of the present invention, when being liquid, an electrolyte can incorporate any of the following compounds, including a potassium compound such as KCl, KI, or KBr; a lithium compound such as $LiBF_4$, $LiClO_4$, $LiPF_6$, or $LiCF_3SO_3$; and a tetraalkylammonium compound such as tetraethylammonium perchlorate, tetrabutylammonium perchlorate, tetraethylammonium borofluoride, tetrabutylammonium borofluoride, or tetrabutylammonium halide. Further, there can preferably be used the fused salt electrolyte compositions described in Paragraph Nos. [0062]-[0081] of JP-A No. 2003-187881. Still further, there can also be used a compound which forms an oxidation-reduction pair such as $I^-/I_3^-$, $Br^-/Br_3^-$, or quinone/hydroquinone.

Further, when being solid, a solid electrolyte can incorporate any of the following compounds exhibiting electron or ion conductivity.

Examples of the compounds include a fluorinated vinyl based polymer containing perfluorosulfonic acid; polythiophene; polyaniline; polypyrrole; a triphenylamine; a polyvinylcarbazole; a polymethylphenylsilane; a calcogenide such as $Cu_2S$, $Ag_2S$, $Cu_2Se$, or $AgCrSe_2$; a fluorine-containing compound such as $CaF_2$, $PbF_2$, $SrF_2$, $LaF_3$, $TlSn_2F_5$, or $CeF_3$; a lithium salt such as $Li_2SO_4$, $Li_4SiO_4$, $Li_3PO_4$; and a compound such as $ZrO_2$, $CaO$, $Cd_2O_3$, $HfO_2$, $Y_2O_3$, $Nb_2O_5$, $WO_3$, $Bi_2O_3$, $AgBr$, $AgI$, $CuCl$, $CuBr$, $CuBr$, $CuI$, $LiI$, $LiBr$, $LiCl_1$, $LiAlCl_4$, $LiAlF_4$, $AgSBr$, $C_5H_5NHAg_5I_6$, $Rb_4Cu_{16}I_7Cl_{13}$, $Rb_3Cu_7Cl_{10}$, $LiN$, $Li_5NI_2$, or $Li_6NBr_3$.

Still further, a gel-like electrolyte can also be used as a supporting electrolyte. When an electrolyte is nonaqueous, there can be used the oil gelling agents described in Paragraph Nos. [0057]-[0059] of JP-A No. 11-185836.

[Thickeners to be Added to the Electrolyte]

In the display element of the present invention, there can be used a thickener for the electrolyte, including gelatin, gum arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly (styrene-maleic anhydride), copoly(styrene-acrylonitrile), copoly(styrene-butadiene), a poly(vinyl acetal) (e.g., poly (vinyl formal) and poly(vinyl butyral)), a poly(vinyl ester), a poly(urethane), a phenoxy resin, poly(vinylidene chloride), a poly(epoxide), a poly(carbonate), poly(vinyl acetate), a cellulose ester, and a poly(amide); and including, as a transparent hydrophobic binder, polyvinyl butyral, cellulose acetate, cellulose acetate butyrate, polyester, polycarbonate, poly (acrylic acid), and polyurethane.

These thickeners may be used in combinations of at least 2 types. There are further listed the compounds described on pages 71-75 of JP-A No. 64-13546. Of these, a compound preferably used includes a polyvinyl alcohol, a polyvinylpyrrolidone, a hydroxypropyl cellulose, and a polyalkylene glycol, form the viewpoint of enhancement of compatibility with various types of additives and of dispersion stability of white particles.

[Other Additives]

The constituent layers of the display element of the present invention include auxiliary layers such as a protective layer, a filter layer, an antihalation layer, a crossover light cutting layer, and a backing layer. These auxiliary layers may incorporate, as appropriate, chemical sensitizers, noble metal sensitizers, photosensitive dyes, supersensitizers, couplers, high boiling point solvents, antifoggants, stabilizers, development inhibitors, bleach accelerators, fixing accelerators, color mixing inhibitors, formalin scavengers, toning agents, hardeners, surfactants, thickeners, plasticizers, lubricants, UV absorbents, anti-irradiation dyes, filter light absorbing dyes, fungicides, polymer latexes, heavy metals, antistatic agents, and matting agents.

The additives described above are detailed in Research Disclosure (hereinafter referred to simply as RD), Vol. 176, (December 1978), RD, Vol. 184, Item/18431 (August 1979), RD, Vol. 187, Item/18716 (November 1979), and RD, Vol. 308, Item/308119 (December 1989).

Types of compounds shown in three of these RD articles are listed below with the described portions thereof.

|  | RD 17643 | | RD 18716 | | RD 308119 | |
|---|---|---|---|---|---|---|
| Additive | Page | *1 | Page | *1 | Page | *1 |
| Chemical Sensitizer | 23 | III | 648 | upper right | 96 | III |
| Sensitizing Dye | 23 | IV | 648-649 | | 996-998 | IV |
| Desensitizing Dye | 23 | IV | | | 998 | IV |
| Dye | 25-26 | VIII | 649-650 | | 1003 | VIII |
| Development Accelerator upper | 29 | XXI | 648 | upper right | | |
| Antifoggant, Stabilizer | 24 | IV | 649 | upper right | 1006-7 | VIII |
| Brightener | 24 | V | | | 998 | V |
| Hardener | 26 | X | 651 | left | 1004-5 | X |
| Surfactant | 26-27 | XI | 650 | right | 1005-6 | XI |
| Antistatic Agent | 27 | XII | 650 | right | 1006-7 | XIII |
| Plasticizer | 27 | XII | 650 | right | 1006 | XII |
| Lubricant | 27 | XII | | | | |
| Matting Agent | 28 | XVI | 650 | right | 1008-9 | XVI |
| Binder | 26 | XXII | | | 1003-4 | IX |
| Support | 28 | XVII | | | 1009 | XVII |

*1: Classification

[Layer Structure]

The constituent layers between the opposed electrodes in the display element of the present invention will now further be described.

As a constituent layer according to the display element of the present invention, a constituent layer incorporating a positive hole transport material can be provided. The positive hole transport material includes, for example, an aromatic amine, a triphenylene derivative, an oligothiophene compound, a polypyrrole, a polyacetylene derivative, a polyphenylene vinylene derivative, a polythienylene vinylene derivative, a polythiophene derivative, a polyaniline derivative, a polytoluidine derivative, CuI, CuSCN, $CuInSe_2$, $Cu(In,Ga)Se$, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

[Substrates]

As a substrate usable in the present invention, there are also preferably used a synthetic plastic film including a polyolefin such as polyethylene or polypropylene, a polycarbonate, cellulose acetate, polyethylene terephthalate, polyethylene dinaphthalene dicarboxylate, a polystyrene naphthalate, polyvinyl chloride, polyimide, a polyvinyl acetal, and polystyrene. A syndiotactic structure polystyrene is also preferable. These can be prepared via the methods described, for example, in each of JP-A Nos. 62-117708, 1-46912, and 1-178505. Further, there are exemplified metal substrates such as stainless steel; paper supports such as baryta paper or resin coated paper; supports prepared by arranging a reflection layer on any of the above plastic films; and those which are described in JP-A No. 62-253195 (pages 29-31) as supports. There can also preferably be used those described on page 28 of RD No. 17643; from the right column of page 647 to the left column of page 648 of RD No. 18716; and on page 879 of RD No. 307105. As these substrates, there can be used those heat-treated at a temperature of at most Tg so that core-set curl is decreased, as described in U.S. Pat. No. 4,141, 735. Further, any of these supports may be surface-treated to enhance adhesion of the support to other constituent layers. In the present invention, there may be employed, as surface treatment, glow discharge treatment, ultraviolet irradiation treatment, corona discharge treatment, and flame treatment. Further, the supports described on pages 44-149 of Kochi Gijutsu (Known Techniques), No. 5 (issued on Mar. 22, 1991, published by Aztech Corp.) may be used. Still further, there are listed those described on page 1009 of RD, No. 308119, and in "Supports" of Product Licensing Index, Vol. 92, Page 108. In addition, glass substrates, and epoxy resins kneaded with glass powder are employable.

[Electrodes]

In the display element of the present invention, at least one of the opposed electrodes is preferably a metal electrode. For the metal electrode, there can be used a metal known in the art such as platinum, gold, silver, copper, aluminum, zinc, nickel, titanium, or bismuth, and alloys thereof. For the metal electrode, preferable are metals exhibiting a work function close to the oxidation-reduction potential of silver in an electrolyte. Of these, a silver electrode or an electrode having a silver content of at least 80% is advantageous to maintain a reduced state of silver, which is also superior in anti-staining of the electrode. As preparation methods of the electrode, there can be used conventional ones such as a vapor deposition method, a printing method, an ink-jet method, a spin coating method, and a CVD method.

Further, in the display element of the present invention, at least one of the opposed electrodes is preferably a transparent electrode. The transparent electrode is not specifically limited if being transparent and electrically conductive. Examples thereof include Indium Tin Oxide (ITO: indium tin oxide), Indium Zinc Oxide (IZO: indium zinc oxide), fluorine-doped tin oxide (FTO), indium oxide, zinc oxide, platinum, gold, silver, rhodium, copper, chromium, carbon, aluminum, silicon, amorphous silicon, and BSO (Bismuth Silicon Oxide). To form an electrode in such a manner, for example, mask deposition via a method of sputtering an ITO film on a substrate, or patterning via a photolithographic method after formation of the entire ITO film may be carried out. The surface resistance value is preferably at most 100Ω/□, more preferably at most 10Ω/□. The thickness of the transparent electrode is not specifically limited, but is commonly 0.1-20 µm.

[Other Components of the Display Element]

For the display element of the present invention, any appropriate sealing agent, columnar structure substance, and spacer particle are employable, if appropriate.

The sealing agent, functioning to enclose the content in order not to leak out, is also referred to as an enclosing agent. As the sealing agent, there are employable curable type resins including thermally curable, light curable, moisture curable, or anaerobically curable resins such as epoxy resins, urethane resins, acrylic resins, vinyl acetate reins, ene-thiol resins, silicone resins, or modified polymer resins.

The columnar structure substance provides strong self-holding force (strength) between the substrates, including, for example, columnar structure substances such as cylindrical, square pole, elliptically cylindrical, and trapezoidally cylindrical substances, wherein these substances are arranged so as to form a predetermined pattern such as a grid at regular intervals. A stripe arrangement at predetermined intervals may be also employed. The columnar structure substance is not arranged at random, but preferably arranged in such a manner as to appropriately hold the distance between the substrates, and not to inhibit displaying images, wherein the columnar structure substance is arranged at regular intervals, in a pattern in which the intervals are gradually varied, or in a predetermined pattern repeated at regular intervals. When the ratio of the display area of the display element occupied by the columnar structure substance is in the range of 1%-40%, the display element exhibits practically adequate strength.

A spacer may be placed between a pair of the substrates to uniformly hold the gap thereof. As the spacer, spherical objects of resins or inorganic oxides are exemplified. Further, an adhesive spacer, the surface of which is coated with a thermoplastic resin, may suitably be used. To uniformly hold the gap between the substrates, the columnar structure substance may be provided by itself, and both of the spacer and the columnar structure substance may be also provided. Further, instead of the columnar structure substance, the spacer may be used by itself as a space-holding member. When a columnar structure is formed, the diameter of the spacer is equivalent to at most the height of the columnar structure substance, but is preferably equal to the height thereof. When no columnar structure substance is formed, the diameter of the spacer is equivalent to the cell gap thickness.

[Screen Printing]

In the present invention, a sealing agent, a columnar structure substance, and an electrode pattern may be formed via a screen printing method. In the screen printing method, the electrode surface of a substrate is covered with a screen having a predetermined pattern, followed by placing a printing material (being a composition, to form the columnar structure substance, such as radiation curable resins) on the screen. Subsequently, a squeegee is moved at a predetermined pressure, angle, and rate, whereby the printing material is transferred onto the substrate via the screen pattern. Then, the transferred material is thermally cured and dried. When the columnar structure substance is formed via the screen printing method, resin materials to be used are not limited to the radiation curable resins. For example, thermally curable resins or thermoplastic resins such as epoxy resins or acrylic resins may be also used. Examples of the thermoplastic resins include polyvinyl chloride resins, polyvinylidene chloride resins, polyvinyl acetate resins, polymethacrylate resins, polyacrylate resins, polystyrene resins, polyamide resins, polyethylene resins, polypropylene resins, fluorine resins, polyurethane resins, polyacrylonitrile resins, polyvinyl ether resins, polyvinyl ketone resins, polyether resins, polyvinyl pyrrolidone resins, saturated polyester resins, polycarbonate resins, and chlorinated polyether resins. These resin materials are preferably used in a paste form prepared by dissolving corresponding resins in appropriate solvents.

After the columnar structure substance has been formed on the substrate as described above, a spacer is provided on at least one of the substrates, as appropriate, and then a pair of the substrates are stacked to form an empty cell, wherein the electrode-forming surfaces are faced each other. A display cell is obtained by bonding a pair of the stacked substrates via heat application under pressure applied from both sides thereof. To prepare a display element, an electrolyte composition is injected between the substrates, for example, via a vacuum injection method. Alternatively, in the bonding process of the substrates, a liquid crystal component may be enclosed just before bonding of the substrates, after the electrolyte component has been dripped on one of the substrates.

[Driving Method of the Display Element]

In the display element of the present invention, it is preferable to perform a driving operation such that blackened silver is deposited by applying a voltage of at least the deposition overpotential and the deposition of blackened silver is continued by applying a voltage of at most the deposition overpotential. Performance of such a driving operation results in reduced writing energy, reduced load of the drive circuit, and enhanced writing speed as an image screen. Existence of overpotential in electrode reaction is generally known in the electrochemistry field. The overpotential is detailed, for example, on page 121 of "Denshi-ido no Kagaku/Denkikagaku Nyumon (Chemistry of Electron Transfer/Introduction to Electrochemistry)" (1996, published by Asakura Shoten). The display element of the present invention is also regarded as electrode reaction of an electrode with silver in an electrolyte so that existence of an overpotential in silver dissolution and deposition is readily understood. Since the magnitude of an overpotential is controlled by an exchange current density, from the fact that after formation of blackened silver, deposition of blackened silver can be continued via application of a voltage of at most a deposition overpotential, it is presumed that the surface of blackened silver has less excess energy, resulting in easy electron injection.

The driving operation for the display element of the present invention is either a simple matrix drive or an active matrix one. In the present invention, the simple matrix drive refers to a driving method, in which current is successively applied to a circuit formed by vertically crossing of an anode line containing plural anodes to a facing cathode line containing plural cathodes. The use of the simple matrix drive has the advantage that the circuit structure and the driving IC can be simplified to reduce the production cost. The active matrix drive refers to a driving method, in which scanning lines, data lines, and current supplying lines are formed on a grid, and driving is carried out via TFT circuits positioned in each of the grids. The active matrix drive is advantageous in gradation and memory functions since a switching function is allocated to each pixel. The circuit described, for example, in FIG. 5 of JP-A 2004-29327 is employable.

[Commercial Applications]

The display element of the present invention is applied to fields including electronically published books, ID cards, public use, transportation, broadcasting, financial clearance, and distribution and logistics. Specific examples include door keys, student ID cards, employee ID cards, membership cards, convenience store cards, department store cards, vending machine cards, gas station cards, subway and railroad cards, bus cards, cashing cards, credit cards, highway cards, driver's license cards, hospital consultation cards, electronic medical charts, health insurance cards, basic resident registers, passports, and electronic books.

EXAMPLES

The present invention will now specifically be described with reference to examples that by no means limit the scope of the present invention. Incidentally, "part" or "%" to be shown in the examples represents "part by weight" or "t by weight" unless otherwise specified.

<<Preparation of Each Component Material>>

(Preparation of Electrolyte Liquid 1)

There were added 90 mg of sodium iodide and 75 mg of silver iodide to 2.5 g of dimethyl sulfoxide, which were completely dissolved to obtain electrolyte liquid 1.

(Preparation of Dispersion 1)

Twenty percent by weight of titanium oxide of an average particle diameter of 300 nm was dispersed in an aqueous solution containing 2% by weight of polyvinyl alcohol (average molecular weight: 30000) using an ultrasonic homogenizer to obtain dispersion 1.

(Preparation of Dispersion 2)

Twenty percent by weight of titanium oxide of an average particle diameter of 20 nm was dispersed in an aqueous solution containing 2% by weight of polyvinyl alcohol (average molecular weight: 30000) using an ultrasonic homogenizer to obtain dispersion 2.

(Preparation of Dispersion 3)

Twenty percent by weight of titanium oxide of an average particle diameter of 300 nm, the particle surface of which had been covered with antimony-doped tin oxide, was dispersed in an aqueous solution containing 2% by weight of polyvinyl alcohol (average molecular weight: 30000) using an ultrasonic homogenizer to obtain dispersion 3.

(Preparation of Electrode 1)

An ITO film of a pitch of 145 μm and an electrode width of 130 μm was formed on a glass substrate of a size of 2 cm×4 cm with a thickness of 1.5 mm using a commonly known method to obtain a transparent electrode (electrode 1).

(Preparation of Electrode 2)

A silver-palladium electrode (electrode 2) of an electrode thickness of 0.8 μm, a pitch of 145 μm, and an electrode distance of 130 μm was formed on a glass substrate of a size of 2 cm×4 cm with a thickness of 1.5 mm using a commonly known method to obtain electrode 2.

(Preparation of Electrode 3)

Dispersion 1 was screen-printed on electrode 2 so as for the average film thickness to become 20 μm after drying, and a solvent was evaporated by drying at 50° C. for 30 minutes, followed by drying 1 hour in an ambience of 85° C. to form a porous white scattering layer, which was designated as electrode 3.

(Preparation of Electrode 4)

Dispersion 1 was screen-printed on electrode 2 so as for the average film thickness to become 10 μm after drying, and a solvent was evaporated by drying at 50° C. for 30 minutes, followed by drying 1 hour in an ambience of 85° C. to form a porous white scattering layer, which was designated as electrode 4.

(Preparation of Electrode 5)

Dispersion 2 was screen-printed on electrode 2 so as for the average film thickness to become 20 μm after drying, and a solvent was evaporated by drying at 50° C. for 30 minutes, followed by drying 1 hour in an ambience of 85° C. to form a porous white scattering layer, which was designated as electrode 5.

(Preparation of Electrode 6)

Dispersion 1 was screen-printed on electrode 2 so as for the average film thickness to become 5 μm after drying, and a solvent was evaporated by drying at 50° C. for 30 minutes. Subsequently, dispersion 2 was further screen-printed thereon so as for the average film thickness to become 15 μm after drying, and a solvent was evaporated by drying at 50° C. for 30 minutes, followed by drying 1 hour in an ambience of 85° C. to form a porous white scattering layer, which was designated as electrode 6.

(Preparation of Electrode 7)

Dispersion 3 was screen-printed on electrode 2 so as for the average film thickness to become 5 μm after drying, and a solvent was evaporated by drying at 50° C. for 30 minutes. Subsequently, dispersion 2 was further screen-printed thereon so as for the average film thickness to become 15 μm after drying, and a solvent was evaporated by drying at 50° C. for 30 minutes, followed by drying 1 hour in an ambience of 85° C. to form a porous white scattering layer, which was designated as electrode 7.

(Preparation of Electrode 8)

Dispersion 1 was screen-printed on electrode 2 so as for the average film thickness to become 5 μm after drying, and a solvent was evaporated by drying at 50° C. for 30 minutes. Subsequently, dispersion 2 was further screen-printed thereon so as for the average film thickness to become 15 μm after drying, and a solvent was evaporated by drying at 50° C. for 30 minutes, followed by drying 1 hour in an ambience of 250° C. to form a porous white scattering layer, which was designated as electrode 8.

(Preparation of Electrode 9)

Dispersion 3 was screen-printed on electrode 2 so as for the average film thickness to become 5 μm after drying, and a solvent was evaporated by drying at 50° C. for 30 minutes. Subsequently, dispersion 2 was further screen-printed thereon so as for the average film thickness to become 15 μm after drying, and a solvent was evaporated by drying at 50° C. for 30 minutes, followed by drying 1 hour in an ambience of 250° C. to form a porous white scattering layer, which was designated as electrode 9.

<<Preparation of Display Elements>>

[Preparation of Display Element 1]

Electrode 3 and electrode 1 were bonded together, followed by heat pressing to prepare an empty cell.

Electrolyte liquid 1 was vacuum injected into the empty cell, and the injection inlet was sealed with an epoxy-based ultraviolet curable resin to prepare Display Element 1.

[Preparation of Display Elements 2-7]

Display Elements 2-7 were prepared in the same manner as in preparation of Display Element 1 except that electrode 3, having been used in preparation of Display Element 1, was exchanged to electrode 4-9, respectively.

<<Evaluation of the Display Elements>>

The characteristics of the prepared display elements each were evaluated based on the following methods.

(Determination of Reflectance During White Display)

White displaying was carried out by applying a voltage of 1.5 V to each of the prepared display elements for 3 seconds, and then the reflectance at 550 nm was determined using spectrophotometer CM-3700d (produced by Konica Minolta Sensing, Inc.). The determined reflectance was designated as $R_W$, which was employed as an indicator for the reflectance during white display.

(Evaluation of Display Speed)

White displaying was carried out by applying a voltage of 1.5 V to each of the prepared display elements for 3 seconds, followed by conducting gray displaying via application of a voltage of −1.5 V for 0.5 second, and then the reflectance at 550 nm was determined using spectrophotometer CM-3700d (produced by Konica Minolta Sensing, Inc.). The determined reflectance was designated as $R_{Glay}$, which was employed as an indicator for the display speed. Herein, a lower $R_{Glay}$ indicates higher display speed.

(Evaluation of Display Nonuniformity Resistance)

White displaying was carried out by applying a voltage of 1.5 V to each of the prepared display elements for 3 seconds, followed by conducting gray displaying via application of a voltage of −1.5 V for 0.5 second, and then the reflectances at 550 nm at 2 random locations of the display element were determined using spectrophotometer CM-3700d (produced by Konica Minolta Sensing, Inc.) to calculate the difference between these reflectances. The calculated reflectance difference was designated as $\Delta R_{Glay}$, which was employed as an indicator for the display nonuniformity resistance. Herein, a lower $R_{Glay}$ indicates less display nonuniformity.

The results obtained as described above are shown in Table 1.

to diffuse; both the first layer and the second layer ensure adequate light blocking; and further the use of titanium oxide of a small average particle diameter for the second layer reduces a resistance value of the second layer, resulting in less voltage drop caused by the porous scattering layer. It is shown that the above effects are more enhanced when titanium oxide covered with an electrically conductive compound is used, being much more enhanced when the porous white scattering layer is fired at a temperature of 250° C.

What is claimed is:

1. A display element comprising an electrolyte layer containing silver or a compound containing silver in a chemical structure thereof and a porous white scattering layer between

TABLE 1

| | | Porous White Scattering Layer | | | | | | | | |
|---|---|---|---|---|---|---|---|---|---|---|
| | | First Layer | | | Second Layer | | Final Drying | Each Evaluation Result | | |
| Display Element No. | Electrode No. | Titanium Oxide Average Particle Diameter | Tin Oxide Cover Presence/ Absence | Film Thickness (μm) | Titanium Oxide Average Particle Diameter | Film Thickness (μm) | Process Temperature (° C.) | White Reflectance $R_W$ (%) | Display Speed $R_{Glay}$ (%) | *1 | Remarks |
| 1 | 3 | 300 nm | absence | 20 | — | — | 85 | 49 | 36 | 9 | Comparative |
| 2 | 4 | 300 nm | absence | 10 | — | — | 85 | 44 | 21 | 8 | Comparative |
| 3 | 5 | 20 nm | absence | 20 | — | — | 85 | 53 | 42 | 13 | Comparative |
| 4 | 6 | 300 nm | absence | 5 | 20 nm | 15 | 85 | 63 | 9 | 3 | Inventive |
| 5 | 7 | 300 nm | presence | 5 | 20 nm | 15 | 85 | 61 | 6 | 2 | Inventive |
| 6 | 8 | 300 nm | absence | 5 | 20 nm | 15 | 250 | 62 | 4 | 2 | Inventive |
| 7 | 9 | 300 nm | presence | 5 | 20 nm | 15 | 250 | 61 | 3 | 1 | Inventive |

*1: Display Nonuniformity Resistance $\Delta R_{Glay}$ (%)

The results listed in Table 1 clearly show that Display Elements 1 and 2 having a porous white scattering layer structured of only one layer of titanium oxide of an average particle diameter of 300 μm result in no compatibility of white reflectance and display speed. The reason is as follows: in the case of Display Element 1 having a porous white scattering layer of a large average film thickness, adequate light blocking enhances white display reflectance, but the restriction of diffusion of electrode reactants and products results in decreased display speed; and in the case of Display Element 2 having a porous white scattering layer of a small film thickness, the promotion of diffusion of the electrode reactants and products enhances display speed, but inadequate light blocking results in decreased white display reflectance.

Further, it is shown that in Display Element 3 having a porous white scattering layer structured of only titanium oxide of an average particle diameter of 20 μm, both white reflectance and display speed are decreased. The reason is that when the average particle diameter of titanium oxide is small, white display reflectance is maintained to some extent, but the void ratio of the porous white scattering layer decreases, whereby diffusion of electrode reactants and products is restricted, resulting in decreased display speed.

In contract, it is shown that in the display element of the present invention structured of a porous white scattering layer of 2 layers each incorporating titanium oxide of different average particle diameters, which is the structure specified by the present invention, compatibility of white reflectance and display speed is realized, and further display nonuniformity is improved. The reason is that the first layer composed of titanium oxide of a large average particle diameter ensures an adequate void ratio to enable electrode reactants and products opposed electrodes, and carrying out driving operation for the opposed electrodes to induce silver dissolution and deposition, wherein the porous white scattering layer is structured of at least 2 layers and an average particle diameter of main component particles forming a first layer is larger than that of main component particles forming a second layer, provided that a porous white scattering layer adjacent to the electrode is designated as the first layer and a porous white scattering layer, located on a side farther than the first layer when viewed from the electrode, is designated as the second layer.

2. The display element described in claim 1, wherein the main component particles forming the first layer is a metal oxide featuring an average particle diameter of 100 nm-1,000 nm, and the main component particles forming the second layer is a metal oxide featuring an average diameter of 5 nm-50 nm.

3. The display element described in claim 1, wherein the metal oxide is titanium oxide.

4. The display element described in claim 3, wherein a particle surface of titanium oxide constituting the first layer is covered with an electrically conductive compound.

5. The display element described in claim 4, wherein the electrically conductive compound is tin oxide doped with antimony.

6. The display element described in claim 1, wherein an average film thickness of the first layer is 0.1 μm-10 μm.

7. The display element described in claim 1, wherein a sum of average film thicknesses of the porous white scattering layers is 15 μm-300 μm.

8. The display element described in claim 1, wherein the porous white scattering layers are subjected to a firing treatment at a temperature of at least 120° C.

9. The display element described in claim 1, wherein a reflectance during white display is 40%-90%.

* * * * *